United States Patent

[11] 3,593,639

| [72] | Inventor | Franz W. R. Starp<br>Black Forest, Germany |
|---|---|---|
| [21] | Appl. No. | 755,134 |
| [22] | Filed | Aug. 26, 1968 |
| [45] | Patented | July 20, 1971 |
| [73] | Assignee | Prontor-Werk Alfred Gauthier, G.m.b.H.<br>Calmbach, Black Forest, Germany |
| [32] | Priority | Aug. 25, 1967 |
| [33] | | Germany |
| [31] | | P 15 72 806.0 |

[54] APPARATUS FOR VARIABLY MASKING A PHOTOELECTRIC CELL IN A PHOTOGRAPHIC APPARATUS
14 Claims, 7 Drawing Figs.

[52] U.S. Cl. ..................................................... 95/64,
95/62, 240/46.13
[51] Int. Cl. ............................................................ G03b 9/02
[50] Field of Search ........................................... 95/64, 62;
240/3.1, 46.13

[56] References Cited
UNITED STATES PATENTS

| 2,396,998 | 3/1946 | Garstang et al. | 240/46.13 X |
| 2,638,825 | 5/1953 | Fairbank | 95/62 X |
| 2,662,457 | 12/1953 | Fairbank | 95/74 |
| 2,950,382 | 8/1960 | Hatch | 240/3.1 |
| 3,299,789 | 1/1967 | Chandler et al. | 95/64 |

Primary Examiner—Samuel S. Matthews
Assistant Examiner—M. D. Harris
Attorney—March, Gillette & Wyatt ABSTRACT: Photographic apparatus for variably masking a photocell including an iris diaphragm and a hole diaphragm. The hole diaphragm has blades with a plurality of openings varying in size, and the iris diaphragm has blades moveable in a closing direction to a predetermined aperture for cooperating with the openings of the hole diaphragm blades.

INVENTOR
Franz W.R. Starp
BY
March, Gillette & Wyatt
ATTORNEYS

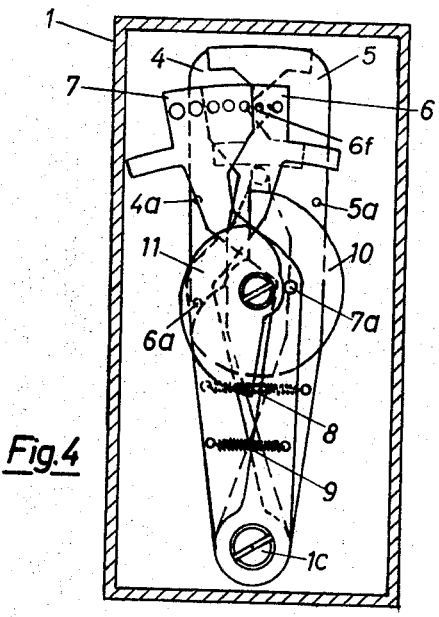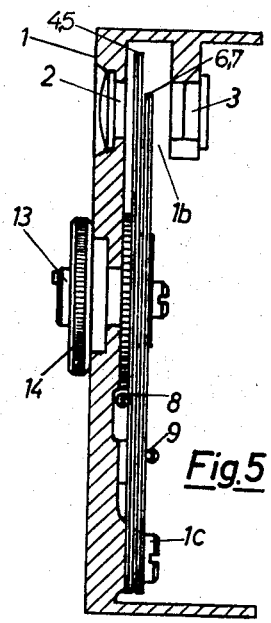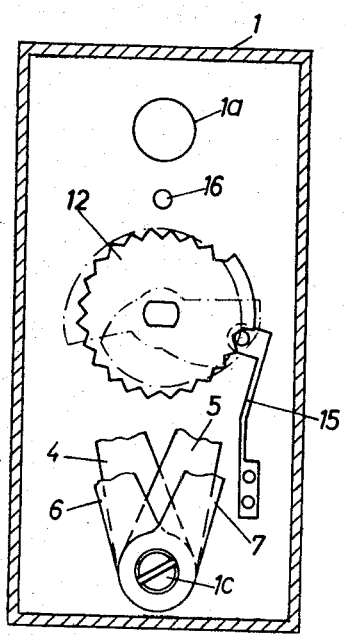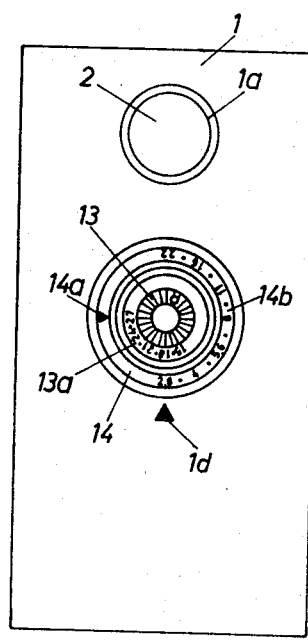

APPARATUS FOR VARIABLY MASKING A PHOTOELECTRIC CELL IN A PHOTOGRAPHIC APPARATUS

The invention concerns a device for variable masking a photoelectric cell, especially a photoelectric resistor built into a photographic apparatus.

In order to be able to take into account the predetermined value of the lens aperture and for the sensitivity of the film material in photographic apparatus such as e.g. a camera equipped with an electronic timing device and a photoelectric resistor for determining the time value in dependence of the light, or an additional apparatus provided with such a device and adapted to be mounted on the camera and providing time control in the "B" setting thereof, masking means have already been provided which provides regulation of the light quantity acting on the photoelectric resistor. For this purpose it is possible to use either masks with variable apertures, or grey filters, or both. Since, however, the mass production of grey filters with uniform density and graduation involves certain difficulties, the use of grey filters has been largely abandoned in practice. For masking a photoelectric cell, an aperture mask is hence preferably used.

If in a photographic apparatus of the kind referred to, it is required to cater for a relatively wide range of lens apertures and/or film sensitivity values, then this means that the shading mask in use has to cover a large number of shading stages. However, the maximum aperture of the mask is substantially determined by the dimensions of the photoelectric cell, which may involve the use of very small aperture masks. These apertures cannot be obtained with high accuracy by the use of iris diaphragms with blades. On the other hand, large aperture diameters may be required which, if provided by hole diaphragms, would require considerable space for the accommodation and movement of the plate having the holes.

It is an object of the invention to improve known devices serving the purpose referred to, in that all the required conditions are fulfilled. This is attained by the combination of an iris diaphragm continuously adjustable with regard to its aperture, and a hole diaphragm having several openings varying in size. This association utilizes the advantages of both types of diaphragm, but avoids their disadvantages. Since the minimum aperture of the iris diaphragm corresponds to the largest hole of the hole diaphragm, the individual holes may be arranged much closer together than in a purely hole-type diaphragm having a range of holes up to a maximum diameter.

In one form of the invention it is proposed for the iris diaphragm to be closable to a predetermined aperture which may correspond to the maximum hole aperture of the hole diaphragm, and that the hole diaphragm which has a series of holes of varying sizes, is adapted thereafter to be moved so as to bring the holes sequentially into the remaining aperture of the iris diaphragm. In this way maximum use is made of both diaphragm systems employed with regard to their capabilities.

According to a further aspect of the invention, provision is made for the iris diaphragm and hole diaphragm each to be formed of two parts, such as coaxially mounted vanes, or sliders displaceable in sliding guides. Which of the two embodiments of diaphragm system is used depends from case to case on the structural conditions and the shape of the photographic apparatus which is to be fitted with the masking device.

When using a two-part hole diaphragm in combination with an adjustable iris diaphragm it is advisable, to provide the conditions which permit the space necessary for moving the hole diaphragm to be limited to a minimum, for both parts of the hole diaphragm to be provided with a row of holes, the parts of the diaphragm being movable successively into and out of the aperture of the iris diaphragm.

A preferred embodiment of the device in accordance with the invention, both from a structural and functional point of view is obtained when the individual parts of the iris and hole diaphragms are each urged together by springs, the parts of the iris diaphragm being supported positively relative to the parts of the hole diaphragm; an adjusting device for moving the iris and hole diaphragm parts is provided which is formed of rotatably mounted cam discs acting directly on the hole diaphragm.

Reliable operation of the masking device is obtained by arranging that each cam disc of the setting device, apart from one cam section mutually displacing the iris and hole diaphragms has further eccentrically extending cam sections causing a setting movement of only the hole diaphragm, and also has concentrically and eccentrically formed cam sections, the arrangement of which is such that the concentric cam section of one cam disc comes simultaneously into action with the eccentric cam section of the other cam disc, both cam sections coming into action alternately. It is also provided that the same setting device is used to actuate both the iris and hole diaphragms. A simplification of adjustment may be obtained by arranging that the setting device used to move the iris and hole diaphragms is influenced by setting buttons taking different adjustment factors into account. In order to ensure a satisfactory and reliably functioning method of operation of the masking device, the setting device may have a stop locating its setting position.

Reference should now be made to the accompanying drawings in which.

Figure 3:
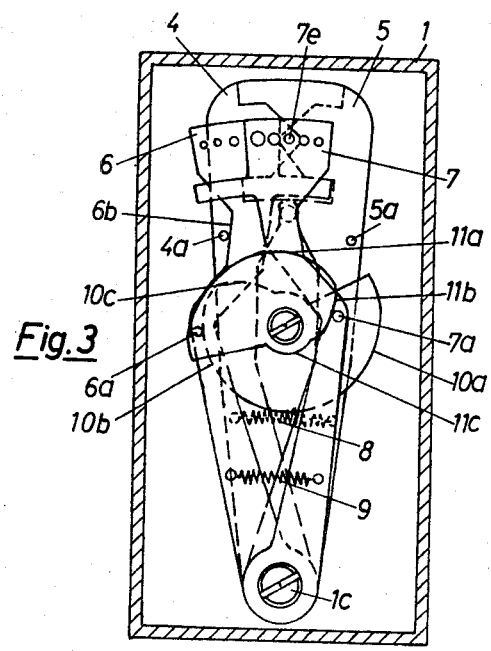

FIG. 3 shows the same diaphragm arrangement with the addition of a hole diaphragm on the first mask blade, FIG. 4 shows the same diaphragm arrangement but with the addition of a hole diaphragm on the second mask blade, FIG. 5 is a partial section through the housing of a photographic apparatus fitted with the diaphragm system, FIG. 6 shows the stop device associated with the setting device for the blade and hole diaphragm, and FIG. 7 is a front elevation of a photographic apparatus fitted with the masking device.

The numeral 1 in the drawing denotes the housing of a photographic apparatus of the kind referred to above. This apparatus as shown especially in FIGS. 1, 6 and 7, has an opening 1a on its front face in which a lens 2 for a photoelectric cell, for example a photoelectric resistor 3, is accommodated. The photoelectric resistor 3 is located with its center on the optical lens of the lens 2. Between this lens and the photoelectric resistor 3, as shown in FIG. 5, an open space 1b is provided in the housing into which components of a masking device, a combination of iris and hole diaphragms project. This masking device is formed of two diaphragm blades 4 and 5 arranged symmetrically to one another, and two perforated vanes 6 and 7. While the iris diaphragm in the embodiment is made variable, the vanes of the hole diaphragm are fitted with rows of holes 6c to 6g or 7c to 7g of varying diameters. The aforesaid parts of the masking device have a fixed common pivot 1c in the housing 1. They are interconnected in pairs, i.e. the iris blades 4 and 5 are joined by a spring 8 and the two hole blades 6 and 7 by a spring 9 both of which act to close the blades towards the optical axis of the lens 2. The above-described pivoted blades may be replaced by sliders which are displaceable along sliding guides, their apertures being similar to the numbers above-described.

Figure 1:
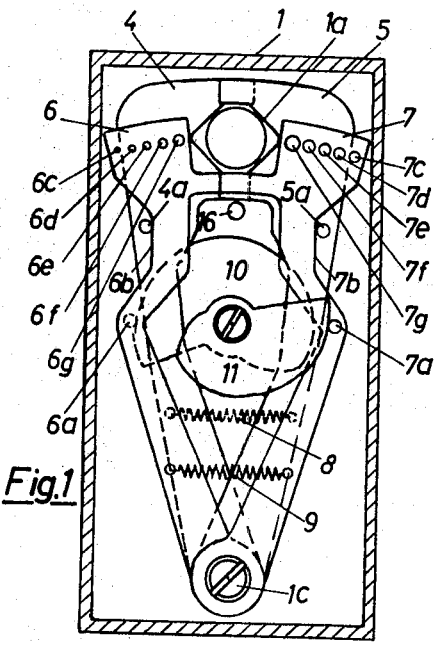
FIG. 1 shows a masking diaphragm at maximum aperture.

To enable the blades 4 to 7 or the aforesaid sliders to be moved, a setting device is provided which comprises two rotatably mounted cam discs 10 and 11. As shown in FIG. 1, the cam discs 10 and 11 can assume such positions that the opening 1a is kept entirely clear of the masking means. The cams act on the masking blades via two rivets 6a and 7a which are located on the hole diaphragm blades 6 and 7. These blades are moved directly by the cam discs 10 and 11, whilst the two blades 4 and 5 of the iris diaphragm are in turn indirectly set by the hole diaphragm blades, via rivets 4a and 5a which are supported against the edges 6b and 7b of the hole diaphragm blades 6 and 7. The cam discs 10 and 11 are connected with a stop disc 12, locatable by a click spring 15 and an adjusting ring 13. The adjusting ring 13 is nonrotatably but detachably connected to a further adjusting disc 14. Between these two parts, the stop device may be fashioned in known manner and requires no detailed explanation. It must however have the same graduation angle as the stop disc 12. The cam discs 10 and 11 are set to these stop graduations in a manner to be described in detail hereinafter. The object of the abovementioned adjusting device formed on the parts 10, 11, 13 and 14 consists in that the masking device is influenced by two exposure factors, to enable both the aperture and film sensitivity to be taken into account. To this end the adjusting disc 13 is fitted with a film sensitivity scale 13a which is to be adjusted in register with a mark 14a on the adjusting disc 14. The adjusting disc 14 carries an aperture scale 14b with which the housing mark 1d is associated.

As shown in FIG. 1, the cam discs 10 and 11 have assumed their extreme positions in accordance with their maximum cam heights. This corresponds with the settings of the adjusting discs 13 and 14 shown in FIG. 7. The light passage opening 1a is hence completely open. Now, if with reference to FIG. 1, the cam discs 10 and 11 are rotated counterclockwise (in FIG. 7 this would correspond to a rotation of the adjusting discs 13 and 14 in a clockwise direction, since here the rotating parts are seen from the other side), the rivets 6a and 7a rest on parts of the surfaces of smaller radius within the eccentric cam sections 10a or 11a. Because of the action of the springs 8 and 9 the hole diaphragm blades 6 and 7 and hence the iris blades 4 and 5 move towards one another. They finally reach an end position, such as shown e.g. in FIG. 2. The edges 4b and 5b of the iris blades 4 and 5 here form the diaphragm aperture.

Figure 2:
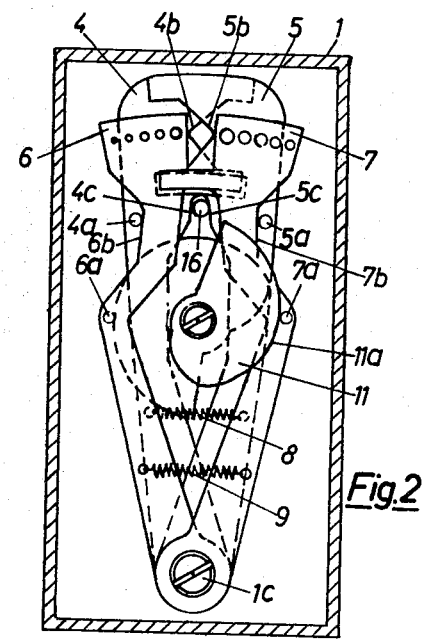
FIG. 2 shows the blade diaphragm closed to minimum aperture.

FIG. 2 shows the combined diaphragm system of the masking device in the transition position, with the smallest aperture to be obtained with the iris blades 4 and 5. Here the two iris blades 4 and 5 are supported with their edges 4c and 5c against a fixed pin 16. The rivet 6a has now reached the beginning of a concentric part 10b of the cam disc 10. Thus, if the cam discs are rotated further in an anticlockwise direction, then only the hole diaphragm blade 7 moves, because only the cam section 11b opposite its rivets 7a has an eccentric shape, whilst the rivet 6a of the hole diaphragm blade 6 slides along a concentric part 10b of the cam disc 10. The diaphragm blades 4 and 5 are unable to move further because, as already mentioned, they are prevented from doing this by abutment against the fixed pin 16. During further rotation of the cam discs 10 and 11, the hole diaphragm blade 7 finally assumes the position shown in FIG. 3. Hence, depending upon the rotation of the cam discs, one of the holes 7c to 7g (in FIG. 3 the hole 7e) registers with its center on the optic axis. The cam pitch is so adapted to the graduations of the stop disc 12 that at every stop notch, one of the holes registers accurately with the optic axis. To ensure this it is possible to use known forms of adjusting devices. It would also be possible e.g. for the rivet 6a or 7a to be formed as an eccentric; it would also be possible to arrange this rivet on a separate carrier adapted to be displaced and clamped firmly relative to the hole diaphragm blade 6 or 7.

When the cam discs 10 and 11 are rotated still further anticlockwise, beyond the position in which the hole 7e registers with the optical axis, then with relation to the associated rivet 6a or 7a, the eccentric part section 11b at the cam disc 11 and the concentric section 10b of the cam disc 10 end. The cam disc 10 now merges again into an eccentric cam part 10c and the cam disc 11 into a concentric part 11c. The transition occurs between two stops of the stop disc 12 in such a manner that the hole diaphragm blade 7 with its last hole 7c is just beyond the range of the optical axis, whilst the hole diaphragm blade 6, up to now inoperative due to the concentric part 10b of the cam disc 10, begins its progressive movement on the cam member 10c and registers its first hole 6g with the optical axis. In FIG. 4 the position is shown in which progressive rotation by one stop has occurred. Consequently the hole 6f has already been brought into register with the optical axis. Beyond this adjustment position the cam discs 10 and 11 are progressively moved until the smallest hole 6c is caused to coincide with the optic axis. This then corresponds to the setting 15° DIN and the aperture value F22 of the aperture scale 14b in FIG. 7. The photoelectric resistor 3 is thus masked to the greatest possible extent and provides in the electronic circuit the longest exposure time for a given subject lighting. When the cam discs 10 and 11 are turned in reverse in a clockwise direction, then the process described occurs in a reverse sequence.

Having thus described my invention I claim:

1. An apparatus for variably masking a photoelectric cell such as a photoelectric resistor built into a photographic apparatus including the combination of an iris diaphragm having a continuously adjustable aperture, a hole diaphragm having a plurality of various size openings selectively registerable with said aperture and adjusting means for moving said hole diaphragm into the desired relation position to align one of said openings in registration with said aperture.

2. The apparatus of claim 1 wherein said iris diaphragm is movable in a closing direction to a predetermined aperture corresponding to the maximum hole diameter of said hole diaphragm, said hole diaphragm being adapted to be thereafter moved to bring its holes successively into the region of said minimum aperture of said iris diaphragm.

3. The apparatus of claim 2 wherein said iris diaphragm and hole diaphragm are each formed of two movably mounted parts.

4. The apparatus of claim 3 wherein said iris diaphragm and hole diaphragm are each formed of two coaxially mounted blades.

5. The apparatus of claim 3 wherein said iris diaphragm and hole diaphragms are each formed of two sliders displaceable in sliding guides.

6. The apparatus of claim 3 wherein said two parts of said hole diaphragm are each provided with a row of holes and are adapted successively to be moved into or out of the aperture of said iris diaphragm.

7. The apparatus of claim 3 wherein said individual parts of said iris and hole diaphragms are respectively biased together by springs, said parts of said hole diaphragm having members engaging said parts of said iris diaphragm, and wherein an adjusting device is provided having rotatably mounted cam discs acting on said hole diaphragm parts for moving said iris and hole diaphragm parts.

8. The apparatus of claim 7 wherein each of said cam discs of said adjusting device has an eccentrically extending cam section mutually moving said iris and hole diaphragms, and wherein said cam discs have further cam sections formed concentrically and eccentrically and acting only on said hole diaphragm parts, the location of said further cam sections being such that the concentric cam section of one cam disc comes simultaneously into action with the eccentric cam section of the other cam disc, and wherein both of said further cam sections come alternately into action.

9. The apparatus of claim 7 wherein a setting device connected to said adjusting device is used for actuating said iris and hole diaphragms.

10. The apparatus of claim 9 wherein said setting device serving to move said iris and hole diaphragms has two adjusting knobs used to take two different exposure factors into account.

11. The apparatus of claim 10 wherein the setting device has a stop associated therewith to locate its setting position.

12. A photographic apparatus for variably masking a photoelectric cell including a housing, iris diaphragm means movably mounted on said housing, said iris diaphragm having two blades with an adjustable aperture coaxially mounted on said housing, hole diaphragm means cooperating with said iris diaphragm, said hole diaphragm means having two blades mounted on said housing coaxially with said iris diaphragm blades, said hole diaphragm blades having a plurality of openings varying in size, said iris diaphragm blades being movable in a closing direction to a predetermined aperture for cooperation with the openings of said hole diaphragm blades, biasing means urging said iris and hole diaphragm blades together, adjusting cam means for moving said diaphragms into the desired relative position.

13. The photographic apparatus of claim 12 wherein said cam means is engaged with said hole diaphragm blades and wherein said hole diaphragm blades have parts engaging said iris diaphragm blades.

14. The photographic apparatus of claim 13 wherein said cam means includes two cams, each engaged with one of said hole diaphragm blades, each of said cams having an eccentrically extending portion for mutually moving said iris and hole diaphragms, and wherein said cams have additional portions formed concentrically and eccentrically, said additional portions of said cam means being operative to cause movement only of said hole diaphragm blades, said additional portions being located so that the additional concentric cam portion of one of said cams comes into action simultaneously with the additional eccentric cam portion of the other of said cams, and wherein both of said additional portions become operative alternately to position said hole diaphragm blades.